United States Patent
Yoshigae

(10) Patent No.: US 7,764,405 B2
(45) Date of Patent: Jul. 27, 2010

(54) IMAGE PROCESSING DEVICE, IMAGE SCANNING DEVICE, AND IMAGE FORMING APPARATUS

(75) Inventor: Takahisa Yoshigae, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 646 days.

(21) Appl. No.: 11/733,952

(22) Filed: Apr. 11, 2007

(65) Prior Publication Data

US 2007/0242155 A1    Oct. 18, 2007

(30) Foreign Application Priority Data

Apr. 17, 2006   (JP)   .............................. 2006-113482

(51) Int. Cl.
H04N 1/40   (2006.01)
(52) U.S. Cl. ...................... 358/445; 358/443; 358/446; 358/474
(58) Field of Classification Search ................. 358/445, 358/446, 443, 448, 482, 483, 463; 250/208.1, 250/216
See application file for complete search history.

(56) References Cited

FOREIGN PATENT DOCUMENTS

| JP | 4-111669 | | 4/1992 |
|---|---|---|---|
| JP | 11-98354 | | 4/1999 |
| JP | 2000-106629 | | 4/2000 |
| JP | 2002-57899 | | 2/2002 |
| JP | 2006101498 A | * | 4/2006 |
| JP | 2007-19764 | | 1/2007 |

* cited by examiner

Primary Examiner—Cheukfan Lee
(74) Attorney, Agent, or Firm—Oblon, Spivak, McClelland, Maier & Neustadt, L.L.P.

(57) ABSTRACT

An image processing device includes an analog processing unit configured to perform line-clamping on an analog electric signal representing image data and to output the line-clamped analog electric signal as an analog image signal, and a fixed electric potential supplying unit configured to supply a fixed electric potential. There is also a variable electric potential supplying unit configured to supply a variable electric potential, a first switch configured to start and stop the line-clamping, and a second switch configured to select the fixed electric potential or the variable electric potential. The image processing device is configured to turn on the first switch at such a timing that an influence of a distorted response waveform, which distorted response waveform is generated when the variable electric potential is switched to the fixed electric potential by the second switch, is reduced.

10 Claims, 9 Drawing Sheets

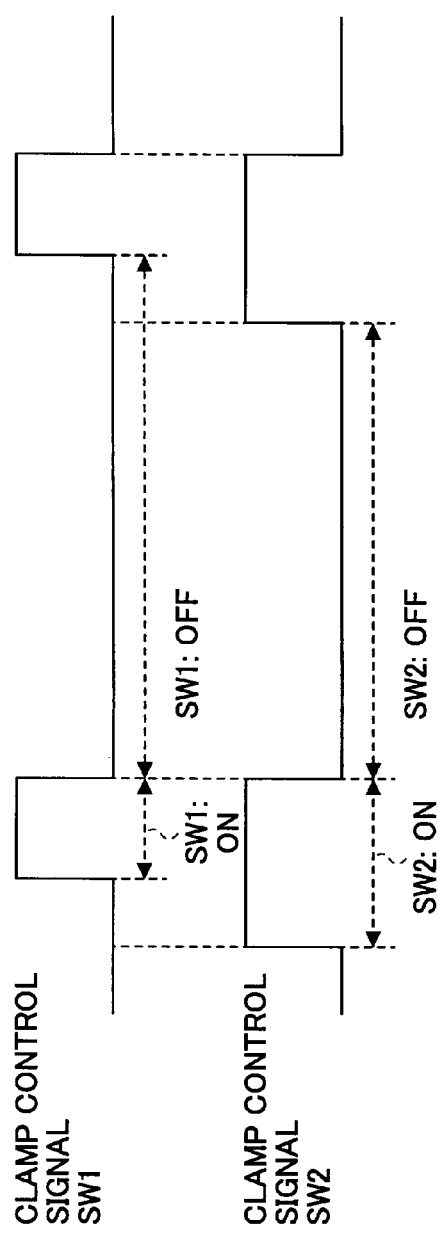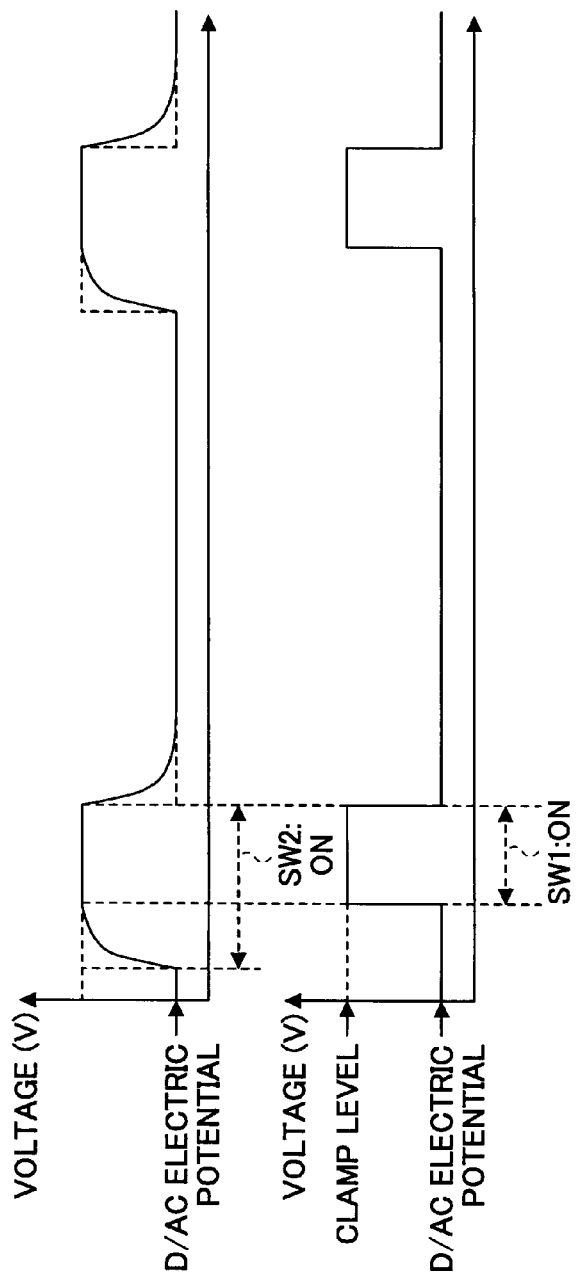

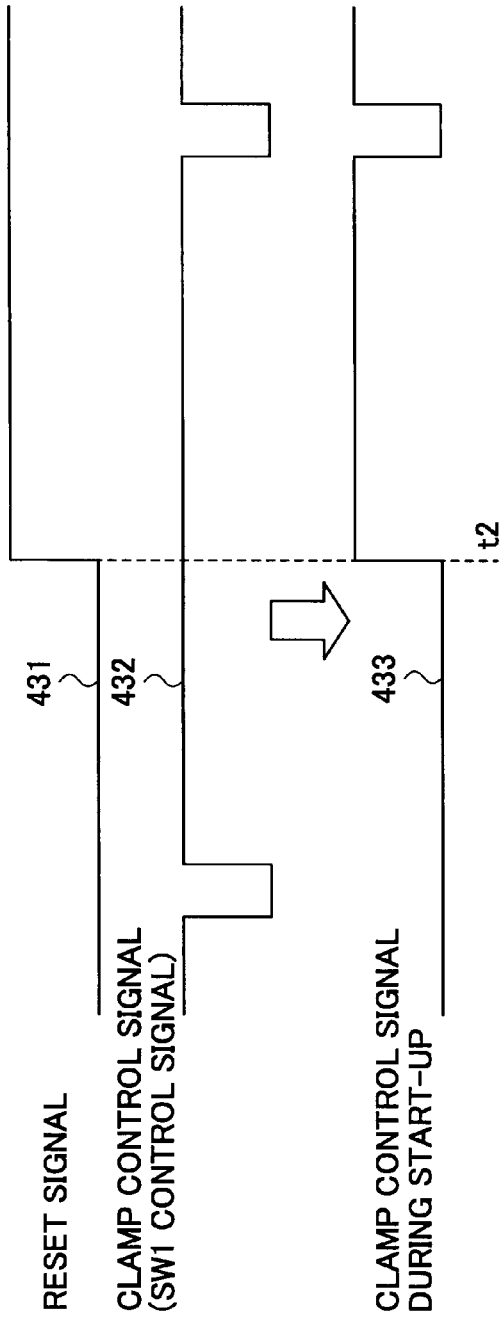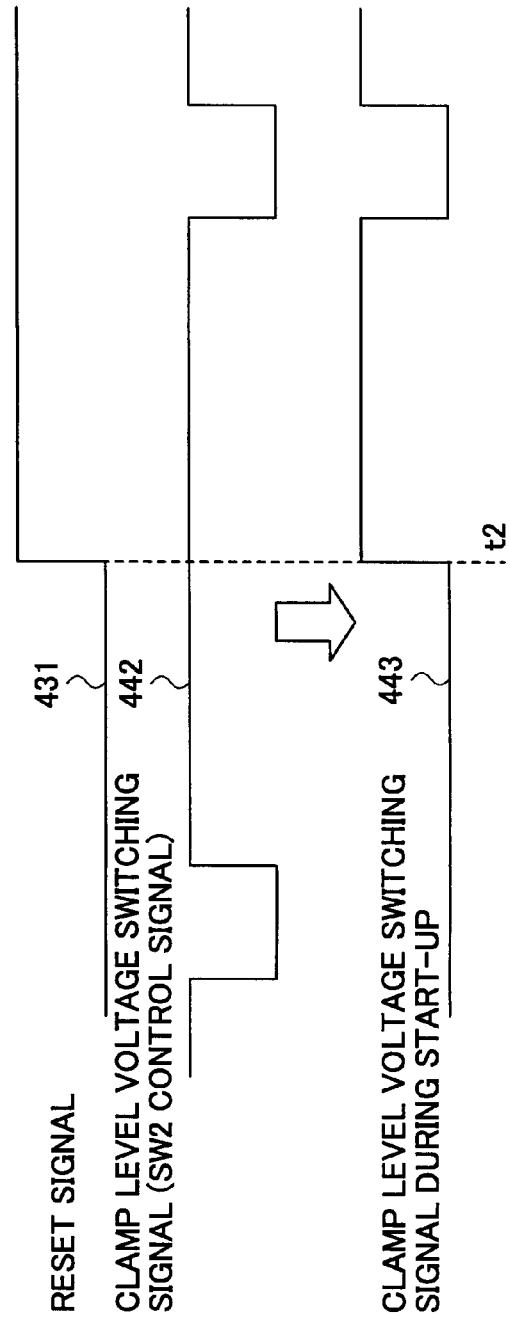

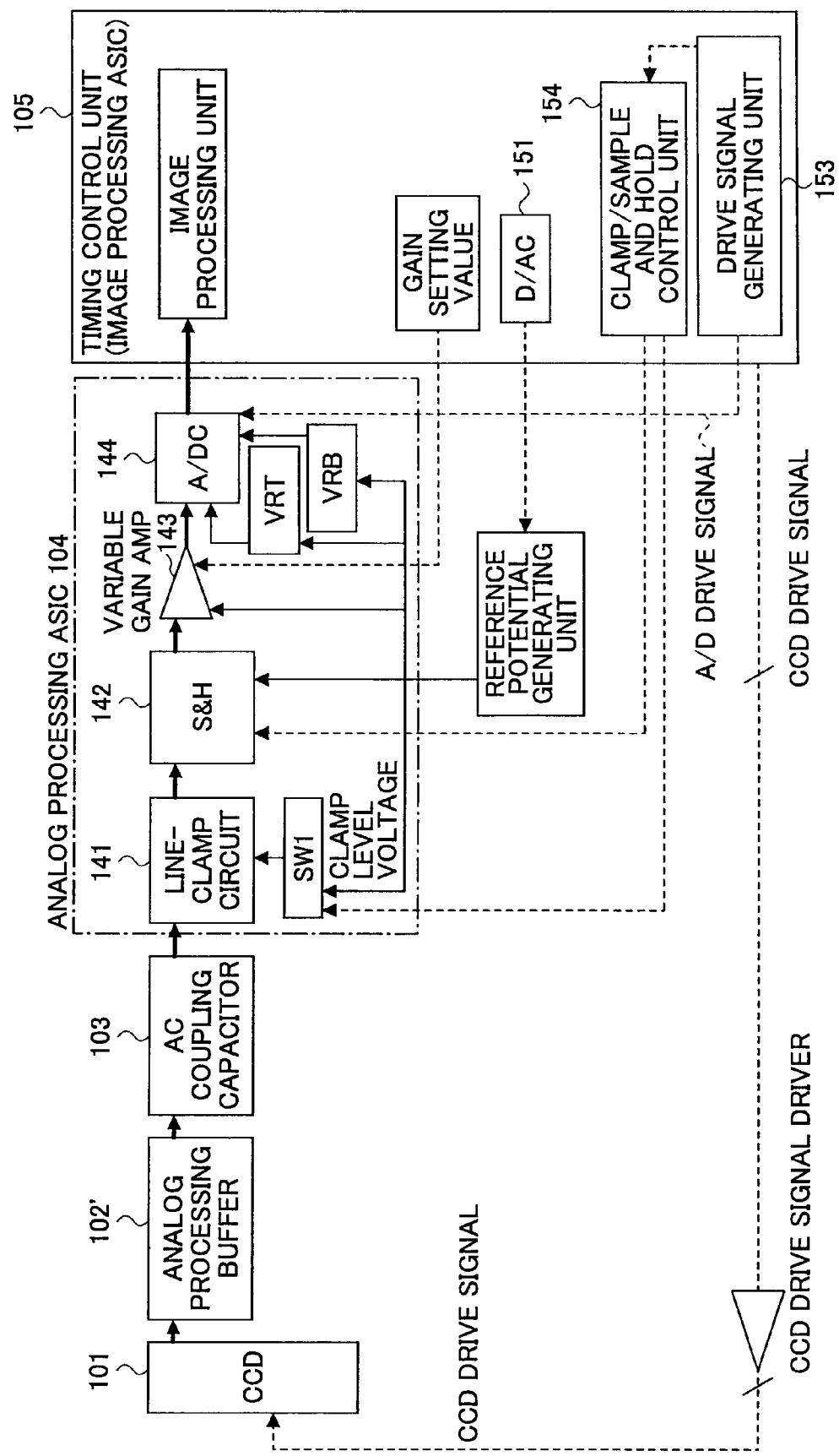

IMAGE PROCESSING DEVICE, IMAGE SCANNING DEVICE, AND IMAGE FORMING APPARATUS

BACKGROUND OF THE INVENTION

1. Field of the Invention

The present invention generally relates to an image scanning device, an image processing device, and an image forming apparatus, and more particularly relates to an image processing device that enables reducing an offset of an image signal, an image scanning device including the image processing device, and an image forming apparatus, such as a copier, a facsimile, or a multifunction copier having functions of a copier and a facsimile, including the image processing device or the image scanning device.

2. Description of the Related Art

In a scanning process by a reducing optical system, a scan head moving in the sub-scanning direction receives reflected light from a document and focuses the reflected light via a lens on a CCD line sensor, and the CCD line sensor converts the focused light into an analog electric signal by photoelectric conversion. Then, the analog electric signal is converted into a digital signal through analog processing and digital processing. Thus, an image on a document is converted into digital data. A conventional scanning process by a reducing optical system is described below with reference to FIG. 9.

FIG. 9 is a block diagram illustrating an exemplary functional configuration of a conventional image scanning device. In the exemplary conventional image scanning device shown in FIG. 9, an analog electric signal obtained by a CCD line sensor (hereafter simply called CCD) 101 is input to an analog processing ASIC 104 via an analog processing buffer 102' and an AC coupling capacitor 103. In the analog processing ASIC 104, line-clamping is performed on the voltage level of a light shield portion 201 or a blank transfer portion 203 (see FIG. 2) in each line cycle of the analog electric signal input from the CCD 101. "Line-clamping" means fixing the voltage level of a portion of a signal at a desired level. The voltage level fixed by line-clamping is called a clamp level and is used as the black level of image data. An exemplary analog electric signal input from the CCD 101 is described below.

FIG. 2 is a drawing used to describe the relationship between an input analog electric signal and a clamp control signal. As shown in FIG. 2, one cycle of an input analog electric signal is composed of a light shield portion 201, an effective pixel portion 202, and a blank transfer portion 203. Each cycle composed of the light shield portion 201, the effective pixel portion 202, and the blank transfer portion 203 is called a line cycle. In FIG. 9, the line-clamped analog electric signal (image signal) is amplified by a variable gain amplifier 143. The gain (ratio of output level to input level) of the variable gain amplifier 143 is predetermined so that a level obtained by scanning a reference white document becomes a target level.

The amplified image signal is converted into a digital signal based on a reference level generated from a reference voltage by an analog-to-digital (A/D) converter 144. Thus, an image on a document is converted into digital data. In the exemplary configuration shown in FIG. 9, driving signals for driving the CCD 101 and the A/D converter 144 of the analog processing ASIC 104 are generated by a driving signal generating unit 153 of a timing control unit 105 based on a reference clock signal.

More specifically, an analog electric signal obtained by the CCD 101 is input to the analog processing ASIC 104 via the analog processing buffer 102' and the AC coupling capacitor 103. In the analog processing ASIC 104, a line-clamp circuit 141 performs line-clamping on the voltage level of the light shield portion 201 or the blank transfer portion 203 in each line cycle of the analog electric signal. The voltage level fixed by line-clamping is called a clamp level and is used by a sample and hold circuit 142 as the black level of image data. The line-clamped analog electric signal (image signal) is amplified by the variable gain amplifier 143 with a predetermined gain. The gain of the variable gain amplifier 143 is so determined that a level obtained by scanning a reference white document becomes a target level. The amplified image signal is converted into a digital signal based on a reference level generated from a reference voltage by the A/D converter 144. Thus, an image on a document is converted into digital data.

In a line-clamping operation, as shown in FIG. 2, the line-clamp circuit 141 clamps the electric potential of the blank transfer portion 203 in each line cycle of an analog electric signal from the CCD 101 to a clamp level. More specifically, a first analog switch SW1 (hereafter, also called a first switch SW1) is kept turned on during a period of time corresponding to the blank transfer portion 203 using a clamp control signal as a switching signal. When the first switch SW1 is turned on, a clamp level voltage is supplied from the outside and the AC coupling capacitor 103 is charged. During a period of time corresponding to the light shield portion 201 and the effective pixel portion 202, the first switch SW1 is kept turned off. Thus, the electric potential of an electric charge stored in the AC coupling capacitor 103 is maintained. The electric potential of the AC coupling capacitor 103, however, changes as the electric charge decreases because of, for example, current leakage. To prevent this change, the first switch SW1 is turned on again at the blank transfer portion 203 in the next line cycle.

In the above line-clamping operation, if the ON-resistance of the first switch SW1 is high, a voltage drop equivalent to "current leakage×ON-resistance" occurs. The voltage drop results in a difference between a usable clamp level voltage and an original clamp level voltage supplied from the outside, and therefore causes an offset of an image signal.

To obviate the above problem, an image scanning device disclosed in patent document 1 is configured to appropriately correct an offset level by using a simple circuit other than a clamp circuit. In the disclosed image scanning device, an offset level detecting unit of a digital processing unit detects an offset level of a digital signal, a correction value calculating unit calculates a correction value that is a deviation from a target level based on the detected offset level, a D/A converter converts the correction value into an analog correction signal, and an offset level correction unit feeds back the analog correction signal directly to an amplifier circuit in an analog processing unit to correct the offset level.

Since no clamp circuit, which may cause a voltage droop, is used, the disclosed image scanning device makes it possible to maintain the offset level of a digital signal without being influenced by a voltage droop.

Also, patent document 2 discloses an image scanning device that can stably and accurately adjust the difference between black levels of analog signals output through different paths from a CCD image sensor. The disclosed image scanning device includes a D/A converter that is selectively connected to a reference terminal of an A/D converter. The disclosed image scanning device detects the difference between the black levels of analog signals output through different paths by connecting the D/A converter to the reference terminal of the A/D converter and by using a stable reference voltage from the D/A converter. With this configuration, the disclosed image scanning device can stably and accurately adjust the difference between the black levels of analog signals without being affected by original image density.

[Patent document 1] Japanese Patent Application Publication No. 2002-057899

[Patent document 2] Japanese Patent Application Publication No. 2000-106629

However, technologies disclosed in patent documents 1 and 2 are not designed to reduce an offset of a clamp level caused by problems related to a clamping operation by an analog processing unit, and therefore cannot be used to reduce an offset of an image signal caused by the difference between a usable clamp level voltage and an original clamp level voltage supplied from the outside.

SUMMARY OF THE INVENTION

The present invention provides an image processing device, an image scanning device, and an image forming apparatus that substantially obviate one or more problems caused by the limitations and disadvantages of the related art.

Embodiments of the present invention provides an image processing device, an image scanning device, and an image forming apparatus that make it possible to reduce an offset of a clamp level caused by problems related to a clamping operation in an analog processing unit.

According to an embodiment of the present invention, an image processing device includes an analog processing unit configured to perform line-clamping on an analog electric signal representing image data and to output the line-clamped analog electric signal as an analog image signal, wherein a clamp level voltage for the line-clamping and a reference voltage of the analog processing unit are the same; a fixed electric potential supplying unit configured to supply a fixed electric potential; a variable electric potential supplying unit configured to supply a variable electric potential; a first switch configured to start and stop the line-clamping; and a second switch configured to select the fixed electric potential or the variable electric potential as the clamp level voltage and the reference voltage; wherein the image processing device is configured to turn on the first switch at such a timing that an influence of a distorted response waveform, which distorted response waveform is generated when the variable electric potential is switched to the fixed electric potential by the second switch, is reduced.

BRIEF DESCRIPTION OF THE DRAWINGS

FIGS. 5A and 5B are timing charts of signals in an exemplary line-clamping operation according to an embodiment of the present invention;

FIGS. 8A and 8B are timing charts of signals during the start-up of an image scanning device; and FIG. 9 is a block diagram illustrating an exemplary electrical configuration of a conventional image scanning device.

DESCRIPTION OF THE PREFERRED EMBODIMENTS

Preferred embodiments of the present invention are described below with reference to the accompanying drawings. In the descriptions below, the same reference numbers are used for parts corresponding to those of the exemplary conventional image scanning device described above, and descriptions of those parts are omitted.

Figure 1:
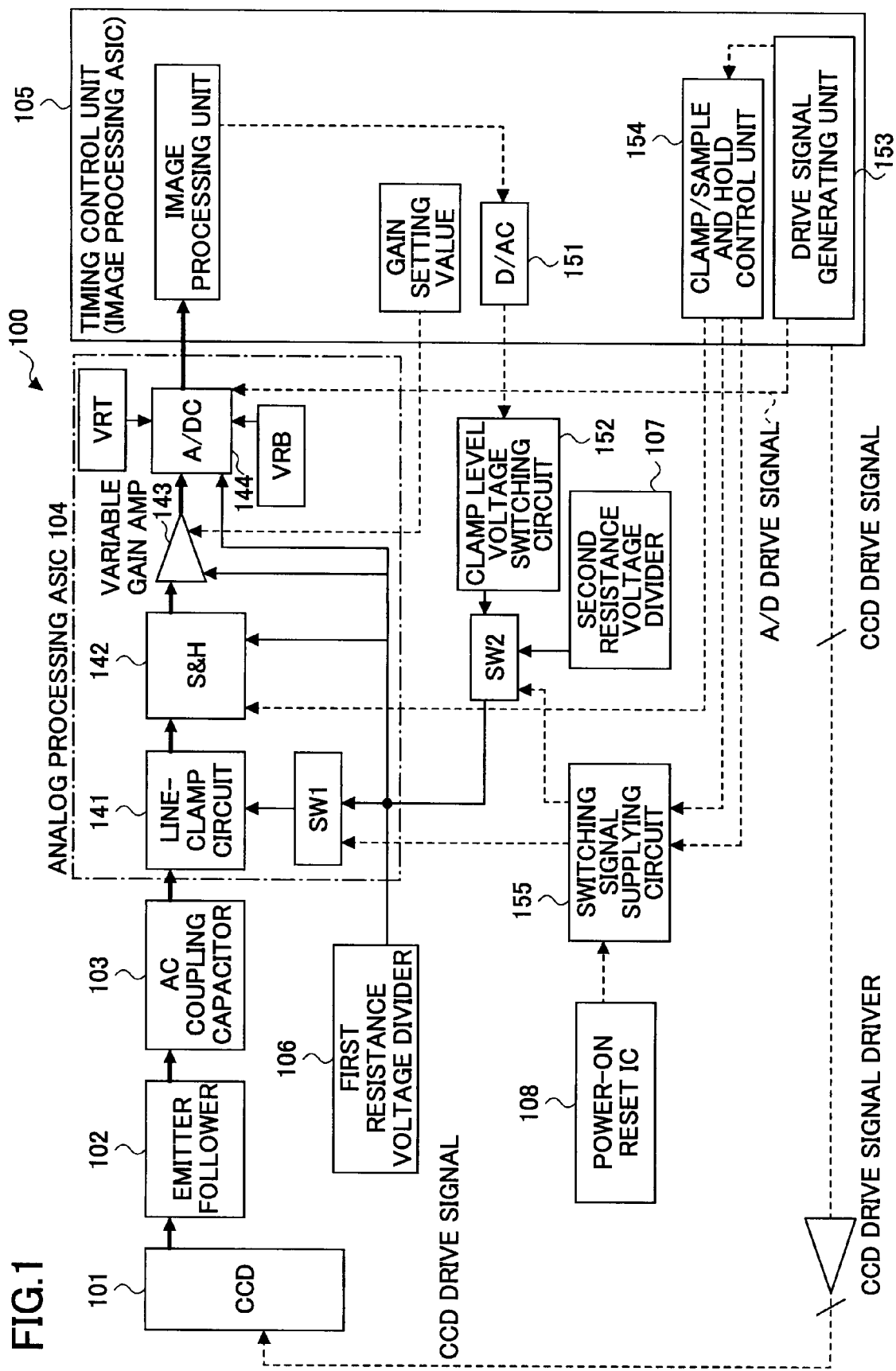
FIG. 1 is a block diagram illustrating an exemplary electrical configuration of an image scanning device according to an embodiment of the present invention.

FIG. 1 is a block diagram illustrating an exemplary electrical configuration of an image scanning device 100 according to an embodiment of the present invention. In the image scanning device 100 of this embodiment, an electric potential generated by a digital-to-analog (D/A) converter 151 may be supplied to a line-clamp circuit 141 of an analog processing ASIC 104. In addition to the D/A converter 151, a first resistance voltage divider 106 and a second resistance voltage divider 107 are provided to supply a first fixed electric potential and a second fixed electric potential, respectively. Also, a second switch SW2 is provided in addition to a first switch SW1, and the first and second switches SW1 and SW2 are controlled by control signals.

Further, in this embodiment, the analog processing ASIC 104 is configured to operate based on a supplied electric potential.

As shown in FIG. 1, the image scanning device 100 includes a charge coupled device (CCD) 101 for receiving reflected light from a document and converting the reflected light into an analog electric signal by photoelectric conversion, an emitter follower 102 for amplifying the analog electric signal from the CCD 101, an AC coupling capacitor 103, an analog processing application specific integrated circuit (ASIC) 104, an image processing ASIC (timing control unit) 105 for timing control, first and second resistance voltage dividers 106 and 107, a power-on reset IC 108, and first and second switches SW1 and SW2.

The CCD 101 receives reflected light from a document via a lens and converts the reflected light into an analog electric signal by photoelectric conversion. The emitter follower 102 amplifies the analog electric signal from the CCD 101 and inputs the amplified analog electric signal into the analog processing ASIC 104 via the AC coupling capacitor 103. The analog processing ASIC 104 includes a line-clamp circuit 141, a sample and hold circuit 142, a variable gain amplifier 143, an A/D converter 144, and the first switch (first analog switch) SW1. The line-clamp circuit 141 performs line-clamping on the voltage level of the light shield portion 201 or the blank transfer portion 203 in each line cycle of the analog electric signal. "Line-clamping" means fixing the voltage of a portion of a signal at a desired level. The voltage level fixed by line-clamping is called a clamp level and is used as the black level of image data.

The sample and hold circuit 142 samples the values of the analog electric signal at specified timings and temporarily stores the sampled values. The variable gain amplifier 143 amplifies the line-clamped analog electric signal (image signal) with a predetermined gain (ratio of output level to input level). The gain of the variable gain amplifier 143 is so determined that a level obtained by scanning a reference white document becomes a target value. The A/D converter 144 converts the amplified image signal into a digital signal based on a reference level generated from a reference voltage. Thus, an image on a document is converted into digital data. The first switch (first analog switch) SW1 is described later. The D/A converter 151 supplies a variable electric potential to the line-clamp circuit 141.

In the image scanning device 100, an electric potential generated by the D/A converter 151 may be supplied to the line-clamp circuit 141 of the analog processing ASIC 104. In addition to the D/A converter 151, the first resistance voltage divider 106 and the second resistance voltage divider 107 are provided to supply a first fixed electric potential and a second fixed electric potential, respectively. Also, the second switch SW2 is provided in addition to the first switch SW1, and the first and second switches SW1 and SW2 are controlled by control signals. Further, in this embodiment, the analog processing ASIC 104 is configured to operate based on a supplied electric potential.

Figure 2:
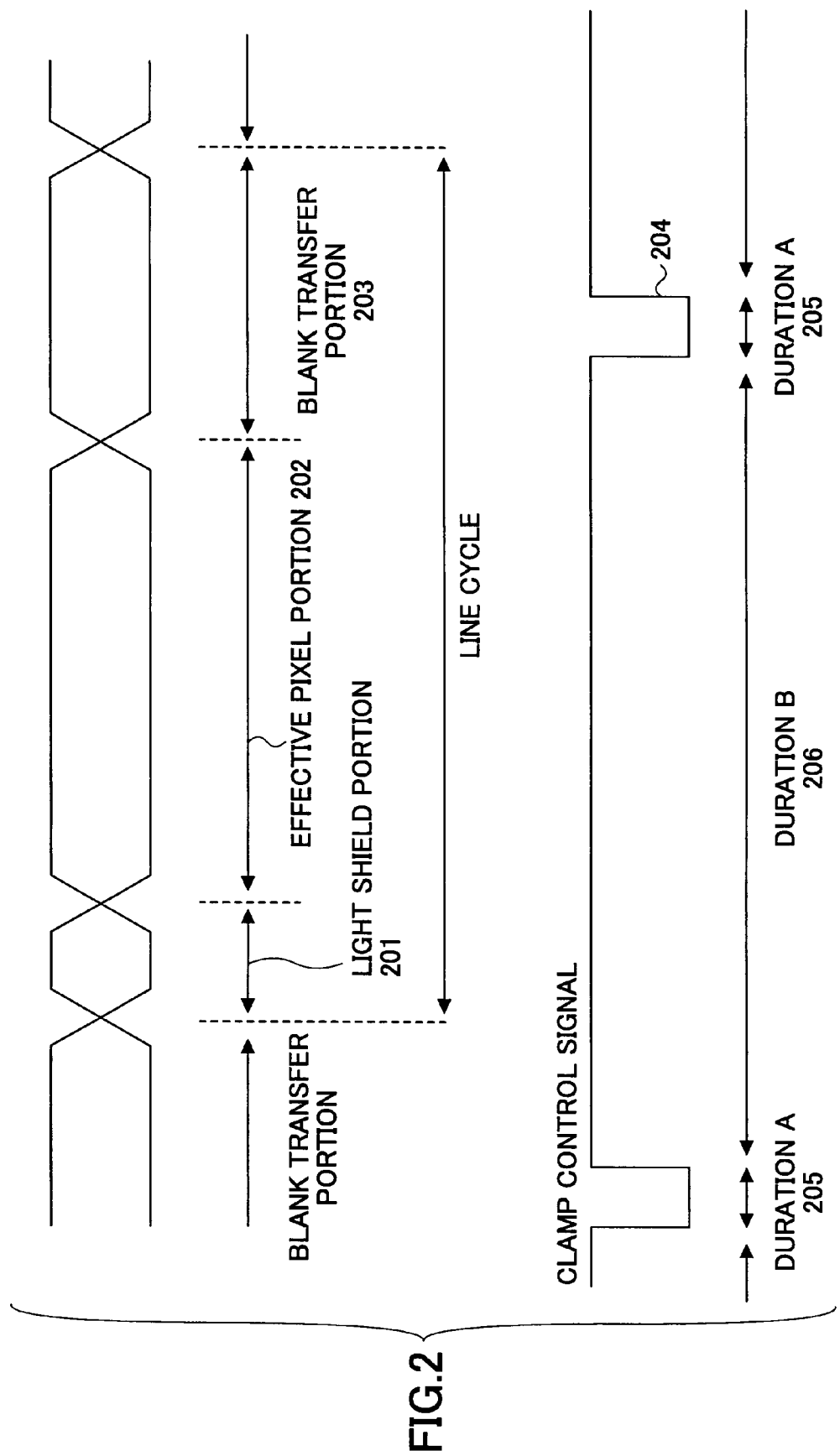
FIG. 2 is a timing chart of signals in an exemplary line-clamping operation.

An exemplary method according to an embodiment of the present invention of compensating for an offset of a clamp level caused by the resistance of an analog switch is described below. FIG. 2 is a timing chart of signals in an exemplary line-clamping operation. As described above, one cycle of an input analog electric signal is composed of the light shield portion 201, the effective pixel portion 202, and the blank transfer portion 203. Each cycle composed of the light shield portion 201, the effective pixel portion 202, and the blank transfer portion 203 is called a line cycle. A line-clamp signal that becomes high in the blank transfer portion 203 is called a clamp control signal 204. The duration when the clamp control signal 204 is ON is called duration A (205) and the duration when the clamp control signal 204 is OFF is called duration B (206).

Figure 3:
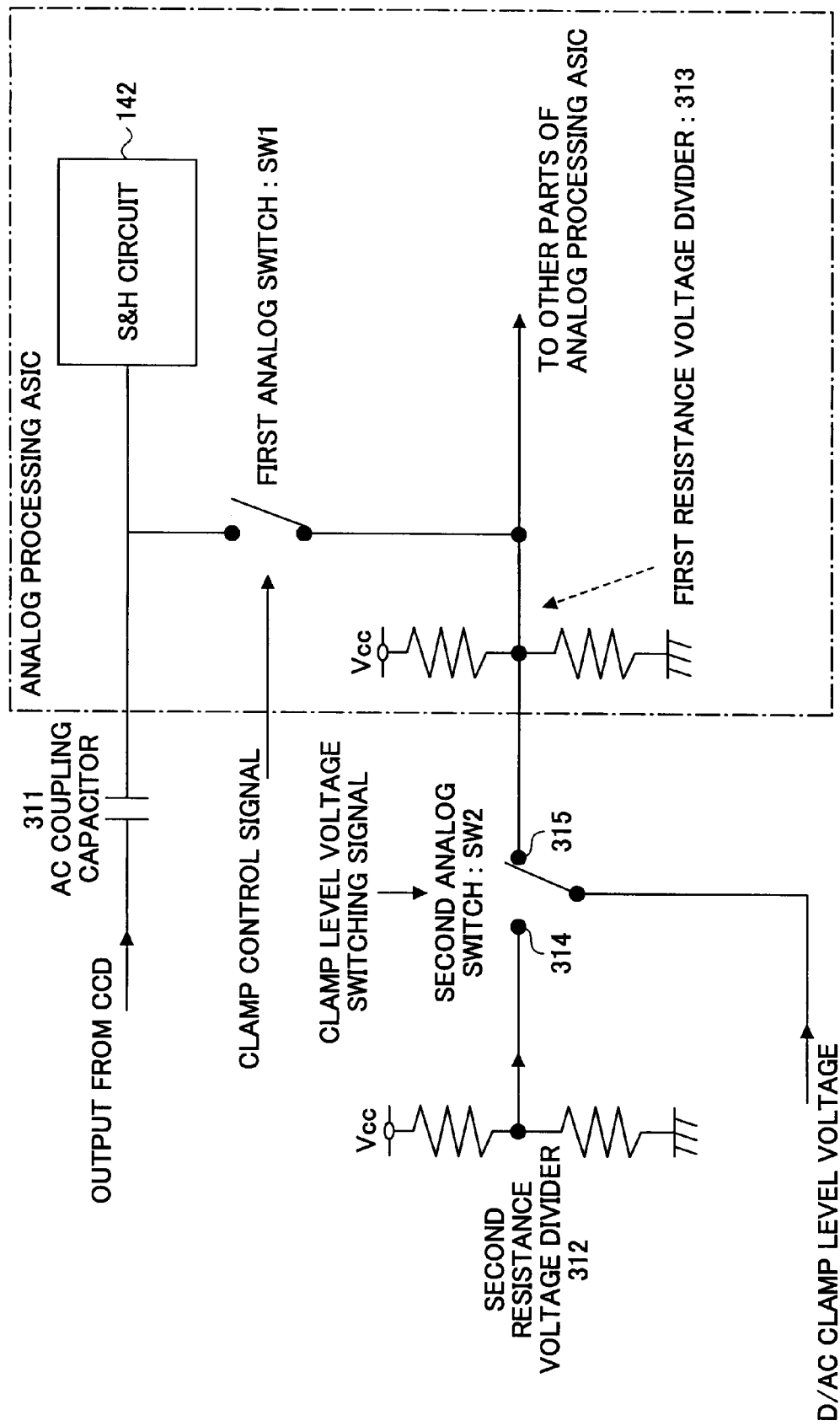
FIG. 3 is a drawing used to describe exemplary operations of analog switches.

FIG. 3 is a drawing used to describe exemplary operations of the first and second switches SW1 and SW2. In FIG. 3, an AC coupling capacitor 311 corresponds to the AC coupling capacitor 103 shown in FIG. 1. Also, first and second resistance voltage dividers 313 and 312 correspond to the first and second resistance voltage dividers 106 and 107 shown in FIG. 1, and a first fixed electric potential and a second fixed electric potential provided by the first and second resistance voltage dividers 313 and 312 correspond to those provided by the first and second resistance voltage dividers 106 and 107.

In FIGS. 2 and 3, during the duration A (205), the second switch SW2 is connected to a contact 314 and the first switch SW1 is turned on. As a result, the AC coupling capacitor 311 is charged by the first fixed electric potential of the first resistance voltage divider 313 and the deviation (offset) of a clamp level caused by voltage drop is reduced. During the duration B (206), the second switch SW2 is connected to a contact 315 and the first switch SW1 is turned OFF. Therefore, the AC coupling capacitor 311 is not charged. In this case, an electric potential (D/AC clamp level voltage), which is determined so as to reduce an offset caused by the resistance of an analog switch, is supplied from the D/A converter 151. The analog processing ASIC 104 operates based on the electric potential supplied from the D/A converter 151.

As another method, it is possible to reduce an offset caused by the resistance of an analog switch by supplying an electric potential from the D/A converter 151 when the clamp control signal 204 is ON and by supplying the first fixed electric potential from the first resistance voltage divider 106 when the clamp control signal 204 is OFF. However, with such a method, since the duration A (205) for charging the AC coupling capacitor 103 (or 311) is a very short period of time in one line cycle and the capacity of the AC coupling capacitor 103 (or 311) is rather large, it takes time to charge the AC coupling capacitor 311. In this embodiment, as described above, the reference potential of the analog processing ASIC 104 is adjusted by the D/A converter 151. This method makes it unnecessary for the line-clamp circuit 141 to wait until the charging of the AC coupling capacitor 103 (or 311) is completed and thereby makes it possible to reduce the time needed for the adjustment.

Also, in this embodiment, the second switch SW2 switches the electric potential from the D/A converter 151 either to the analog processing ASIC 104 or to the second resistance voltage divider 107 (or 312). If the circuit connecting the D/A converter 151 is open while the D/A converter 151 is not connected to the analog processing ASIC 104, the connected loads when the circuit is open and when the circuit is closed become much different. This may cause problems such as ringing and oscillation in the D/A converter 151. The image scanning device 100 is configured as described above to reduce the change in connected load and thereby to obviate the above problems.

An exemplary conventional clamping operation is described below.

Figure 4A:
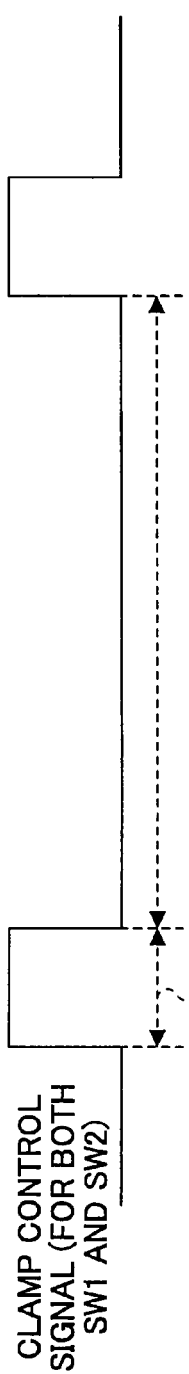
FIGS. 4A through 4C are timing charts of signals in a conventional line-clamping operation.
Figure 4B:
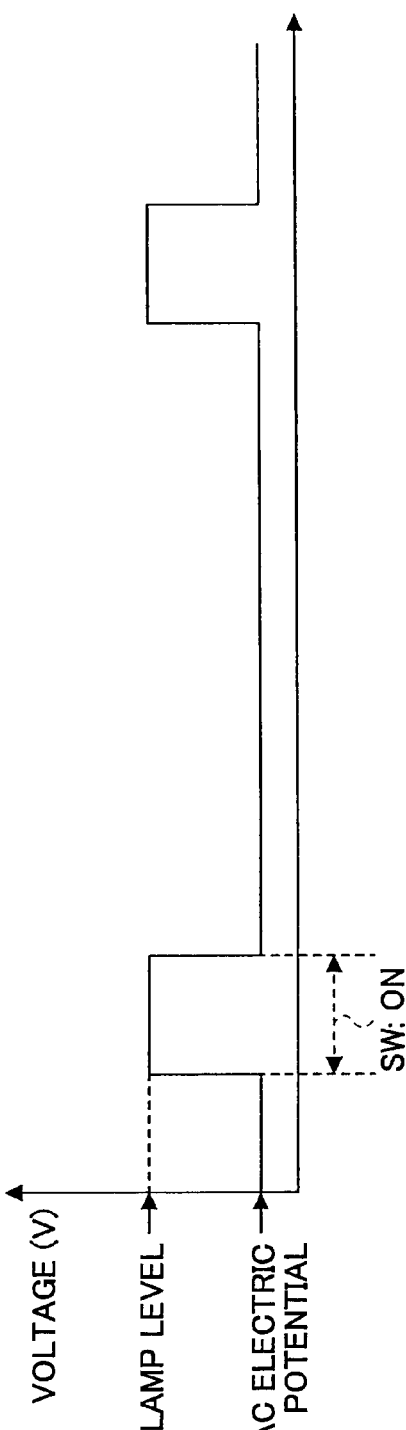
Figure 4C:
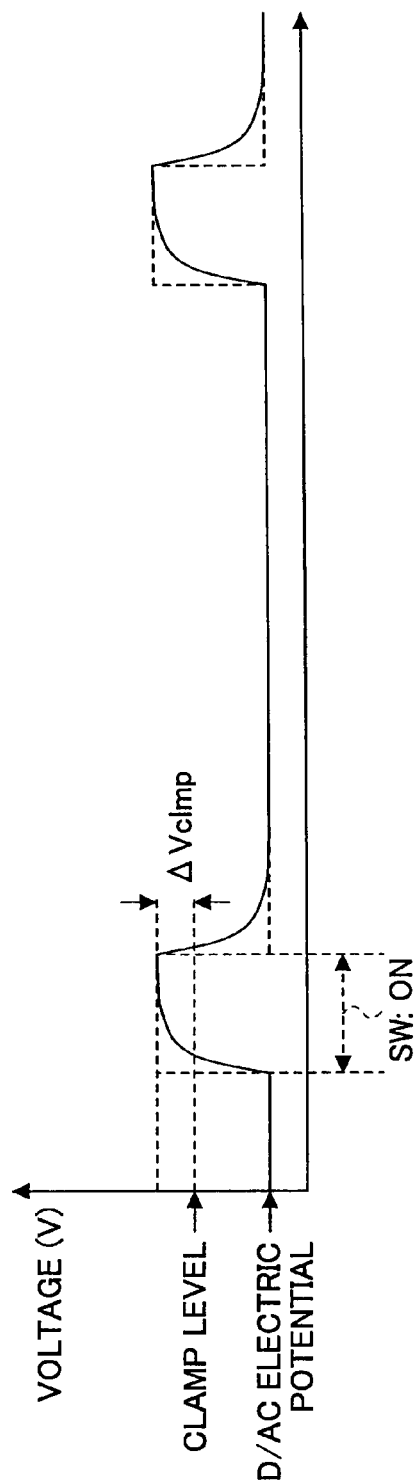

FIGS. 4A through 4C are drawings used to describe a conventional clamping operation. In the exemplary conventional clamping operation, as shown in FIG. 4A, the first and second switches SW1 and SW2 are controlled by the same clamp control signal. When the first switch SW1 is ON, the first fixed electric potential of the first resistance voltage divider 313 (or 106) is supplied to the analog processing ASIC 104 and line-clamping is performed using the first fixed electric potential. When the first switch SW1 is OFF, an electric potential from the D/A converter 151 is supplied to the analog processing ASIC 104. The first and second switches SW1 and SW2 are controlled by a clamp/sample and hold control unit 154 via a switching signal supplying circuit 155. A drive signal generating unit 153 supplies a driving signal to the clamp/sample and hold control unit 154.

As shown in FIG. 4B, when the response waveform is not distorted, the clamp level matches the waveform of the clamp control signal shown in FIG. 4A. However, as shown in FIG. 4C, when the response waveform is distorted, the distortion causes a difference ($\Delta Vclmp$) between a clamped electric potential and the first fixed electric potential (clamp level voltage) supplied from the first resistance voltage divider 313 (or 106) while the first switch SW1 is ON. This is because the AC coupling capacitor 311 is charged by the average electric potential level during a period of time when the first switch SW1 is ON. The difference $\Delta Vclmp$ differs depending on the potential difference between the electric potential from the D/A converter 151 and the first fixed electric potential of the first resistance voltage divider 106 (or 313). Therefore, when the electric potential from the D/A converter is changed to reduce an offset, the difference $\Delta Vclmp$ also changes. Normally, the clamp level is attained by using the first fixed electric potential of the first resistance voltage divider 106. However, when the waveform is distorted, the attained clamp level deviates from a target value. Also, a large capacity of the AC coupling capacitor 103 makes it necessary for the line-clamp circuit 141 to wait until the AC coupling capacitor 103 is sufficiently charged, and thereby increases the time needed to adjust the reference potential.

In this embodiment, as shown in FIG. 5A, the second switch SW2 switches the sources of voltage from the D/A converter 151 to the first resistance voltage divider 106 before the first switch SW1 is turned on. As shown in FIG. 5B, the time between the timing when the second switch SW2 is operated and the timing when the first switch SW1 is turned on is preferably enough for the distorted waveform to return to normal. Thus, by operating the second switch SW2 and the first switch SW1 at timings as described above, line-clamping can be performed during a period of time when the waveform is stable. In other words, as shown by the lower chart in FIG. 5B, after the distorted waveform returns to normal and becomes stable, the first switch SW1 is turned on and the average voltage reaches the clamp level. This configuration makes it possible to eliminate the influence of response waveform distortion and thereby to eliminate the difference ΔVclmp.

Meanwhile, as described above, the duration A (205) for charging the AC coupling capacitor 103 is a very short period of time in one line cycle. Therefore, if the same clamp control signal as that used in normal operation is used at the start-up of the image scanning device 100, it takes much time or number of lines to sufficiently charge the AC coupling capacitor 103. Also, since the CPU of the image scanning device 100 is not activated yet at the start-up, it is not possible to control the charging process by a program. To obviate these problems, as shown in FIG. 6, a signal switching unit according to an embodiment of the present invention is so configured that a clamp control signal is always turned on and a fixed electric potential is constantly supplied as a clamp level voltage during the start-up of an image scanning device.

Figure 6:
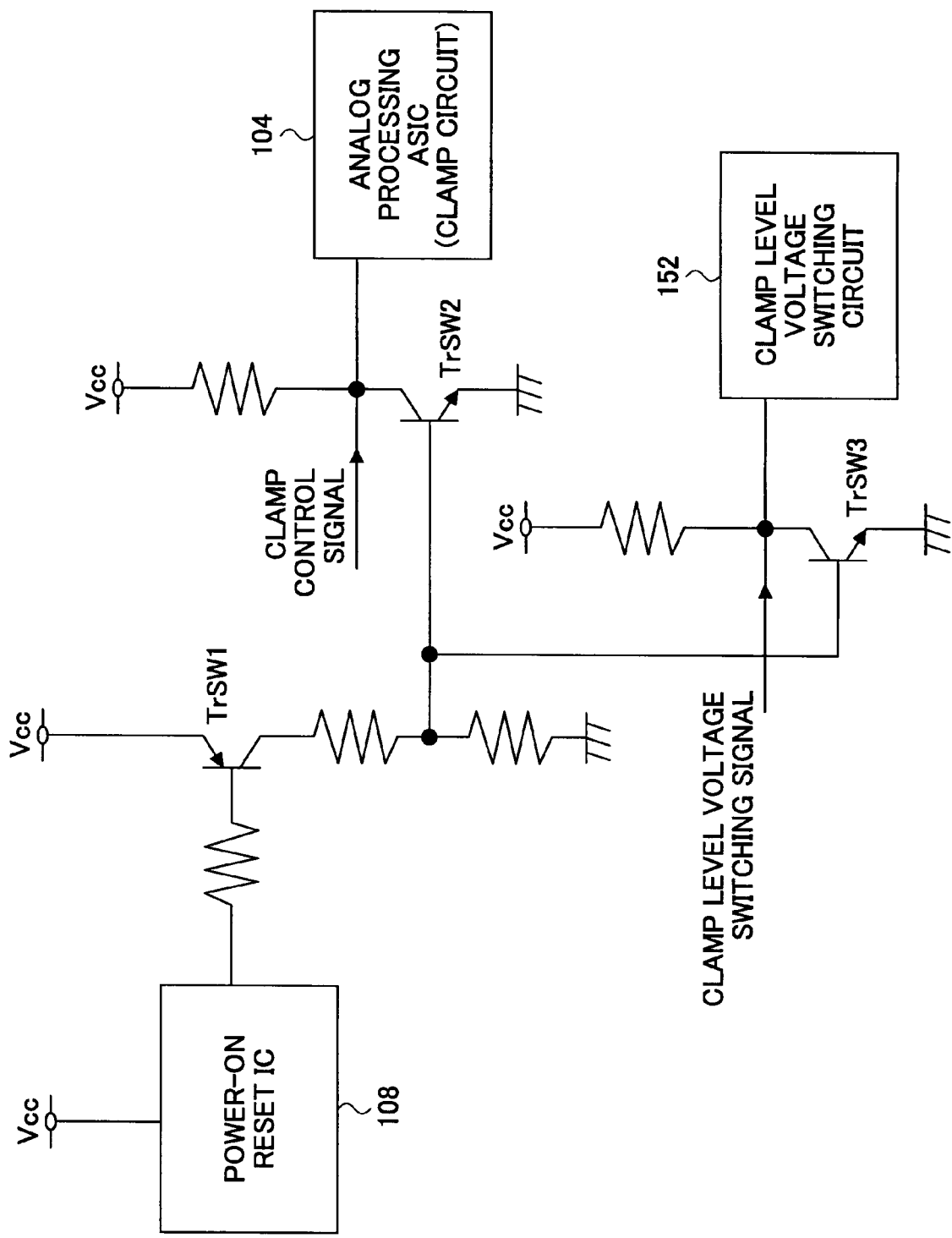
FIG. 6 is a circuit diagram illustrating an exemplary signal switching unit where a clamp control signal is always turned ON during the start-up of an image scanning device to supply a fixed electric potential as a clamp level voltage.
Figure 7:
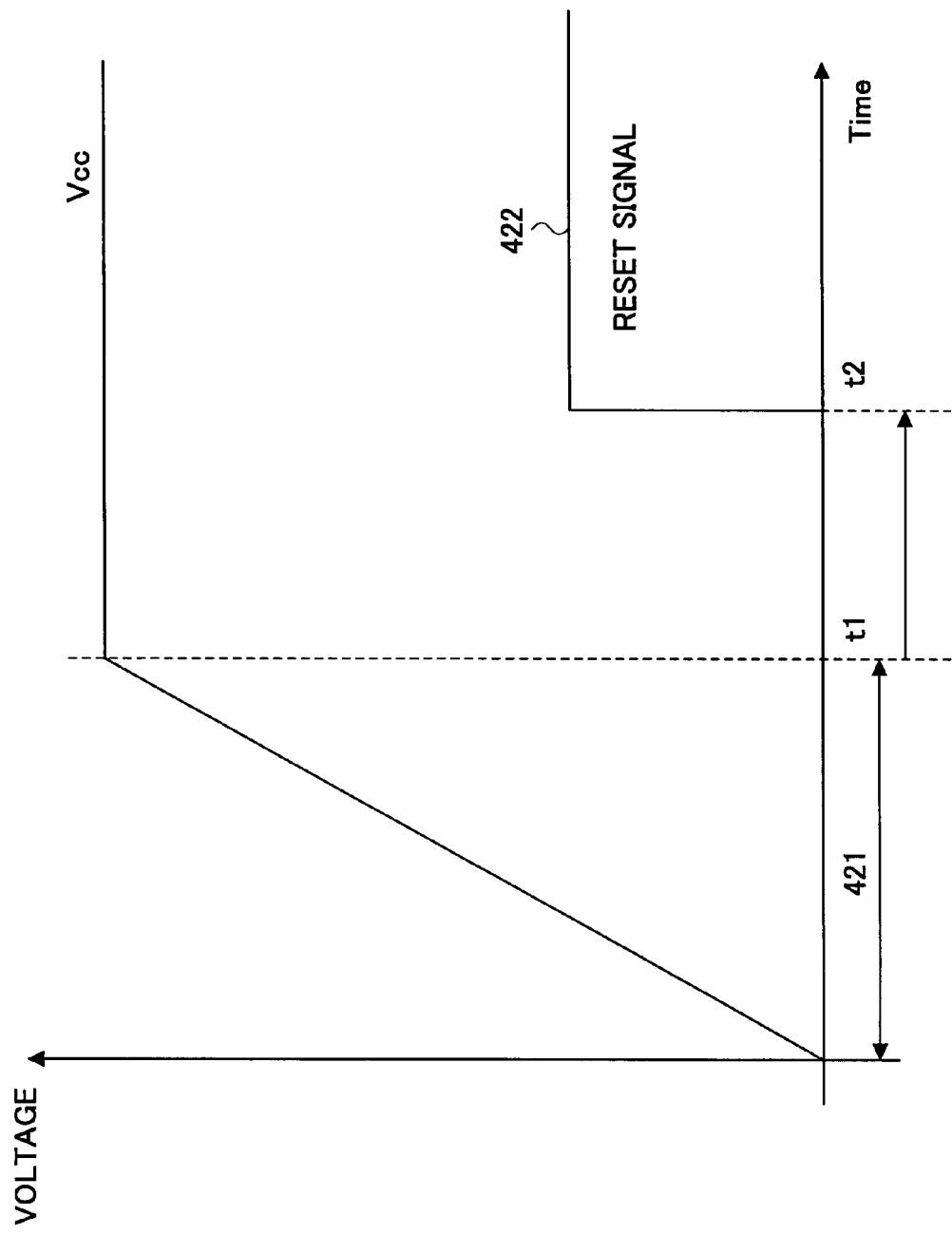
FIG. 7 is a graph showing voltage change during rise time and an output level of a reset signal.

An exemplary signal switching unit shown in FIG. 6 includes a power-on reset IC 108, three transistor (Tr) switches TrSW1, TrSW2, and TrSW3, and resistors. As shown in FIG. 7, the power-on reset IC 108 monitors the power-supply voltage from a power line and outputs a reset signal after a certain period of time from the rise of the power-supply voltage. FIG. 7 is a graph showing voltage change during rise time and the output level of a reset signal. In FIG. 7, the vertical axis indicates voltage levels and the horizontal axis indicates time. Duration 421 is the rise time of the power-supply voltage. Time t1 indicates the time when the power-supply voltage reaches its peak level. After the time t1, the power supply voltage becomes constant. At time t2, the power-on reset IC 108 outputs a reset signal 422. The reset signal 422 from the power-on reset IC 108 is connected to a clamp control signal and a clamp level voltage switching signal via the transistor switches TrSW1, TrSW2, and TrSW3. At the start-up, since the reset signal is not being output from the power-on reset IC 108, the transistor switches TrSW1, TrSW2, and TrSW3 are ON. At this point, the clamp control signal and the clamp level voltage switching signal become low and the line-clamp circuit 141 is charged by the first fixed electric potential of the resistance voltage divider 106. In FIG. 6, 152 indicates a clamp level voltage switching circuit. The transistor switches TrSW1, TrSW2, and TrSW3 and the resistors in FIG. 6 constitute the switching signal supplying circuit 155.

FIGS. 8A and 8B are timing charts of signals during the start-up of an image scanning device. In FIGS. 8A and 8B, 431 indicates a reset signal from the power-on reset IC 108, 432 indicates a normal clamp control signal (SW1 control signal), 433 indicates a clamp control signal during the start-up, 442 indicates a normal clamp level voltage switching signal (SW2 control signal), and 443 indicates a clamp level voltage switching signal during the start-up. Time t2 in FIGS. 8A and 8B indicates the time when the power-on reset IC 108 outputs the reset signal 431. At the start-up, since the reset signal 431 is not being output from the power-on reset IC 108, the transistor switches TrSW1, TrSW2, and TrSW3 are ON. Before the time t2, since the clamp control signal 433 is always low and the first switch SW1 is always ON, the line-clamp circuit 141 is charged by the first fixed electric potential of the resistance voltage divider 106.

At time t2, when the line-clamp circuit 141 is sufficiently charged, the power-on reset IC 108 outputs the reset signal 431. As a result, the transistor switches TrSW1, TrSW2, and TrSW3 become OFF, and the clamp control signal 432 and the clamp level voltage switching signal 442 are supplied to the first switch SW1 and the second switch SW2, respectively. Then, a normal clamping operation is started. This configuration makes it possible to reduce the time needed to charge a line-clamp circuit during the start-up of an image scanning device.

If an offset in the line-clamp circuit 141 to be caused by the ON-resistance of an analog switch is predictable, it is possible to predetermine the electric potential to be generated by the D/A converter 151 according to the offset and thereby to compensate for the offset. However, since the ON-resistance of an analog switch depends on the configuration of a chip, it is difficult to predict an offset. Also, it is difficult to predict the amount of current leakage since it depends on the quality of parts in a chip. In this embodiment, to obviate these problems, a feedback loop is provided to calculate an electric potential (D/AC value) to be generated by the D/A converter 151 according to measured values. This configuration makes it possible to accurately compensate for an offset that varies depending on the ON-resistance and the current leakage.

The D/AC value is obtained as described below. First, a reference level Black_Target is determined. Next, an update value ΔSet_Dac_Data(n+1) to update a current D/AC value is obtained from a scanned level Black_Data of the light shield portion 201 and the reference level Black_Target by the following formula:

$$\Delta \text{Set\_}Dac\text{\_Data}(n+1)=\alpha \times (\text{Black\_Target-Black\_Data}(n))$$

In the above formula, α indicates a correction coefficient obtained from the gain in the analog processing unit.

Then, a next D/AC value is obtained from the update value ΔSet_Dac_Data(n+1) by the following formula:

$$\text{Set\_}Dac\text{\_Data}(n+1)=\text{Set\_}Dac\text{\_Data}(n)+\Delta \text{Set\_}Dac\text{\_Data}(n+1)$$

The offset can be adjusted to a target level by updating the D/AC value several times as described above.

Thus, the above embodiments make it possible to reduce an offset in the line-clamp circuit 141 of the image scanning device 100 caused by the ON-resistance of the first and second analog switches SW1 and SW2 and current leakage. Also, the above embodiments make it possible to reduce the time needed to charge the AC coupling capacitor 103, to eliminate the influence of response waveform distortion that occurs when the sources of voltages are switched, and thereby to accurately adjust the offset of an image signal.

In the embodiments described above, examples of image forming apparatuses are omitted. However, it is easy to produce an image forming apparatus having the function of a copier by combining, for example, an electrophotographic printer or an inkjet printer with the image scanning device 100 described above.

As described above, embodiments of the present invention provide, for example, the following advantages:

1) To reduce an offset of a clamp level in an analog clamp circuit of an analog processing unit by using different voltages during a period of time when clamping is performed and a period of time when clamping is not performed, and by performing a clamp operation and switching of the voltages at timings that make it possible to eliminate the influence of response waveform distortion that occurs when the voltages are switched.

2) To prevent an offset caused by response waveform distortion, which occurs when switching the sources of voltage from a D/A converter to a first resistance voltage divider, by switching the voltages a certain period of time earlier than a timing when the first switch SW1 is turned on.

3) To reduce the time needed to charge a clamp circuit during the start-up of an image scanning device by switching control signals using hardware.

4) To reduce the time needed to charge a clamp circuit by switching control signals using a simple circuit including a power-on reset IC, transistors, and resistors.

5) To calculate the level of an electric potential to be generated by a D/A converter by using a feedback loop and thereby to accurately compensate for an offset of a clamp level.

In descriptions in the present application, an analog processing unit corresponds to the analog processing ASIC 104, a fixed electric potential supplying unit corresponds to the first resistance voltage divider 106, a variable electric potential supplying unit correspond to the D/A converter 151, a first switch corresponds to the first analog switch SW1, a second switch corresponds to the second analog switch SW2, a signal switching unit corresponds to the power-on reset IC 108 and the transistor switches TrSW1, TrSW2, and TrSW3 (or the switching signal supplying circuit 155), a power-supply voltage detecting circuit corresponds to the power-on reset IC 108, an A/D converter corresponds to the A/D converter 144, a photoelectric conversion element corresponds to the CCD 101, and an image scanning device corresponds to the image scanning device 100.

In an image scanning device according to an embodiment of the present invention, a first switch is turned on at such a timing that an offset of a clamp level, which offset is caused by response waveform distortion that occurs when voltages are switched by a second switch, is reduced. This configuration makes it possible to reduce an offset of a clamp level in a clamp circuit of an analog processing unit.

The present invention is not limited to the specifically disclosed embodiments, and variations and modifications may be made without departing from the scope of the present invention.

The present application is based on Japanese Priority Application No. 2006-113482, filed on Apr. 17, 2006, the entire contents of which are hereby incorporated herein by reference.

What is claimed is:

1. An image processing device, comprising:
an analog processing unit configured to perform line-clamping on an analog electric signal representing image data and to output the line-clamped analog electric signal as an analog image signal, wherein a clamp level voltage for the line-clamping and a reference voltage of the analog processing unit are the same;
a fixed electric potential supplying unit configured to supply a fixed electric potential;
a variable electric potential supplying unit configured to supply a variable electric potential;
a first switch configured to start and stop the line-clamping; and
a second switch configured to select the fixed electric potential or the variable electric potential as the clamp level voltage and the reference voltage;
wherein the image processing device is configured to turn on the first switch at such a timing that an influence of a distorted response waveform, which distorted response waveform is generated when the variable electric potential is switched to the fixed electric potential by the second switch, is reduced.

2. The image processing device as claimed in claim 1, wherein the image processing device is configured to operate the second switch a specified period of time before turning on the first switch.

3. The image processing device as claimed in claim 2, wherein the specified period of time is enough for the distorted response waveform to return to normal.

4. The image processing device as claimed in claim 1, further comprising:
a signal switching unit configured to automatically change states of a clamp control signal for controlling the first switch and a clamp level voltage switching signal for controlling the second switch during start-up of the image processing device.

5. The image processing device as claimed in claim 4, wherein the signal switching unit includes transistor switches and a power-supply voltage detecting circuit.

6. The image processing device as claimed in claim 1, further comprising:
an A/D converter configured to convert the analog image signal from the analog processing unit into a digital image signal; and
a feedback loop configured to perform a process of changing a level of the variable electric potential to be generated by the variable electric potential supplying unit based on the digital image signal and to repeat the process for a certain number of times to make the level of the variable electric potential match a target level.

7. An image scanning device, comprising:
a photoelectric conversion element configured to convert light reflected from a document into an analog electric signal by photoelectric conversion; and
the image processing device as claimed in claim 1 to process the analog electric signal from the photoelectric conversion element.

8. The image scanning device as claimed in claim 7, wherein the image processing device further includes
an A/D converter configured to convert the analog image signal from the analog processing unit into a digital image signal; and
a feedback loop configured to perform a process of changing a level of the variable electric potential to be generated by the variable electric potential supplying unit based on the digital image signal and to repeat the process for a certain number of times to make the level of the variable electric potential match a target level.

9. An image forming apparatus including the image processing device as claimed in claim 1.

10. An image forming apparatus including the image scanning device as claimed in claim 7.

* * * * *